United States Patent [19]

Burgdorf et al.

[11] 4,386,808
[45] Jun. 7, 1983

[54] PRESSURE CONTROL VALVE

[75] Inventors: Jochen Burgdorf, Offenbach; Hans-Dieter Reinartz; Horst Quitmann, both of Frankfurt am Main, all of Fed. Rep. of Germany

[73] Assignee: ITT Industries, Inc., New York, N.Y.

[21] Appl. No.: 288,633

[22] Filed: Jul. 30, 1981

[30] Foreign Application Priority Data

Sep. 15, 1980 [DE] Fed. Rep. of Germany ...... 3034738

[51] Int. Cl.³ .............................................. B60T 8/26
[52] U.S. Cl. ..................................................... 303/6 C
[58] Field of Search ............... 188/349; 303/6 C, 6 R, 303/24 F; 137/493, 493.9, 498

[56] References Cited

U.S. PATENT DOCUMENTS 3,597,009 8/1971 Baldwin ............................. 303/6 C
3,795,424 3/1974 Lewis .................................. 303/6 C
4,199,197 4/1980 Maehara ......................... 303/6 C X Primary Examiner—Duane A. Reger
Attorney, Agent, or Firm—John T. O'Halloran; Alfred C. Hill

[57] ABSTRACT

A known pressure control valve for vehicular hydraulic brake systems comprises a valve inserted between an inlet and an outlet with a control piston acting as a valve closure member and slidable in opposition to a spring force. The control piston cooperates with a sealing device encompassing the control piston, the sealing device carrying a valve seat and acting as a check valve from the outlet to the inlet. In accordance with the present invention the control piston is supported in an annular member which is axially slidable in a tubular member and a compression spring to provide the spring force is disposed outside the tubular member with at least one surface against which the compression spring abuts being adjustable during assembly.

17 Claims, 2 Drawing Figures

PRESSURE CONTROL VALVE

BACKGROUND OF THE INVENTION

The present invention relates to a pressure control valve for vehicular hydraulic brake systems incorporating a valve arranged between an inlet and an outlet, having a control piston acting as a valve closure member, slidable against the force of a spring and cooperating with a sealing device encompassing the control piston, which carries on its part a valve seat and acts as a check valve from the outlet chamber to the inlet chamber.

In today's brake systems for automotive vehicles, pressure control valves are assigned preferably to the wheel brake cylinders of the rear axle and control the braking force at the rear wheels during a braking action dependent on the dynamic axle-load distribution.

A pressure control valve of the type referred to hereinabove is known from German Patent DE-AS No. 1,580,148. The pressure-reducing valve therein described includes basically a housing having an outlet port, an inlet port and a pressure chamber arranged therebetween. Guided in the pressure chamber and in further bores of the housing is a differential piston constructed as a stepped piston which is in its rest position pressed against a stop at the outlet port by the force of a spring. Pressure supplied to the inlet port propagates through the pressure chamber and past a sealing ring having a sealing lip inserted in annular grooves of the stepped piston to the outlet port, with the pressure prevailing at the outlet port exerting a force on the stepped piston acting in opposition to the spring force. Upon attainment of a specific pressure level, the stepped piston moves in an axial direction against the force of the compression spring and urges the sealing ring against a valve seat. A further pressure increase at the inlet will, however, assist the force of the compression spring so that a backward movement of the stepped piston is started. Now the pressure in the outlet is permitted to rise again up to a predetermined value which is sufficient to displace the stepped piston once more against the force of the compression spring and against the increased pressure in the pressure chamber. As a result, taking into account the spring force, the pressure built up in the pressure chamber will be transmitted to the outlet solely in ratio of the pressurized surfaces of the stepped piston.

The end of the stepped piston remote from the outlet is guided in a blind-end bore of the housing, in which pressure fluid will gather in a certain mounting position of the pressure-reducing valve which could escape through leaks. With the aid of an air cushion and another sealing ring, this pressure fluid is fed back into the brake circuit when the stepped piston moves upwardly. This mode of operation will, however, take place only if the pressure-reducing valve has assumed a specific mounting position in the vehicle. Moreover, the air cushion exerts an undefined force on the stepped piston, by which the change-over point of the pressure-reducing valve is displaced an appreciable amount. A further disadvantage of the arrangement described is that the change-over point is determined by the constructional dimensioning of the compression spring, without the possibility being afforded during the assembly to compensate for possible manufacturing tolerances of the compression spring. Even if auxiliary means were provided for a subsequent adjustment, this could only be effected by means of a complicated measuring operation by measuring the characteristic curve of the assembled valve. Also, a control of the change-over point can only be carried out by means of a pressure check. In addition, the comparatively complicated construction of the stepped piston causes high manufacturing costs. It is another essential disadvantage of the known device that the pressure in the wheel brake cylinders of the rear axle remains at a constant level when the brake is released until the pressure in the inlet chamber falls below the pressure level in the outlet chamber. In this state of operation, the braking effect of the rear axle is maintained, although the braking pressure in the front axle has already decreased considerably.

SUMMARY OF THE INVENTION

It is, therefore, an object of the present invention to provide a simple pressure control valve of the type mentioned hereinabove wherein the change-over point is adjustable during the assembly in a simple manner and which is insertable in a housing as a prefabricated and adjusted unit.

A feature of the present invention is the provision of a pressure control valve for a vehicular hydraulic brake system comprising: a housing having a longitudinal axis, a pressure fluid inlet and a pressure fluid outlet; a valve disposed in the housing between the inlet and the outlet for pressure control, the valve including a tubular member disposed in the housing coaxial of the axis, an annular member disposed coaxial of the axis within the tubular member in an axially slidable relationship therewith, a control piston disposed coaxial of the axis extending through and in a slidable relationship with the annular member, and a sealing device carried by the control piston cooperating with the annular member to provide the pressure control; and a compression spring disposed in the housing coaxial of the axis outside the tubular member, the spring acting on the control piston to provide a force against which the spring must act to establish a predetermined change-over point for the pressure control valve, the spring abutting against at least one abutment surface which is adjustable during assembly.

Due to the outside location of the compression spring, the spring force is able to be adjusted very precisely by a simple force-measuring operation so that a minimum range of variation with regard to the change-over point will occur in a number of similar devices.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENTS

Figure 1:
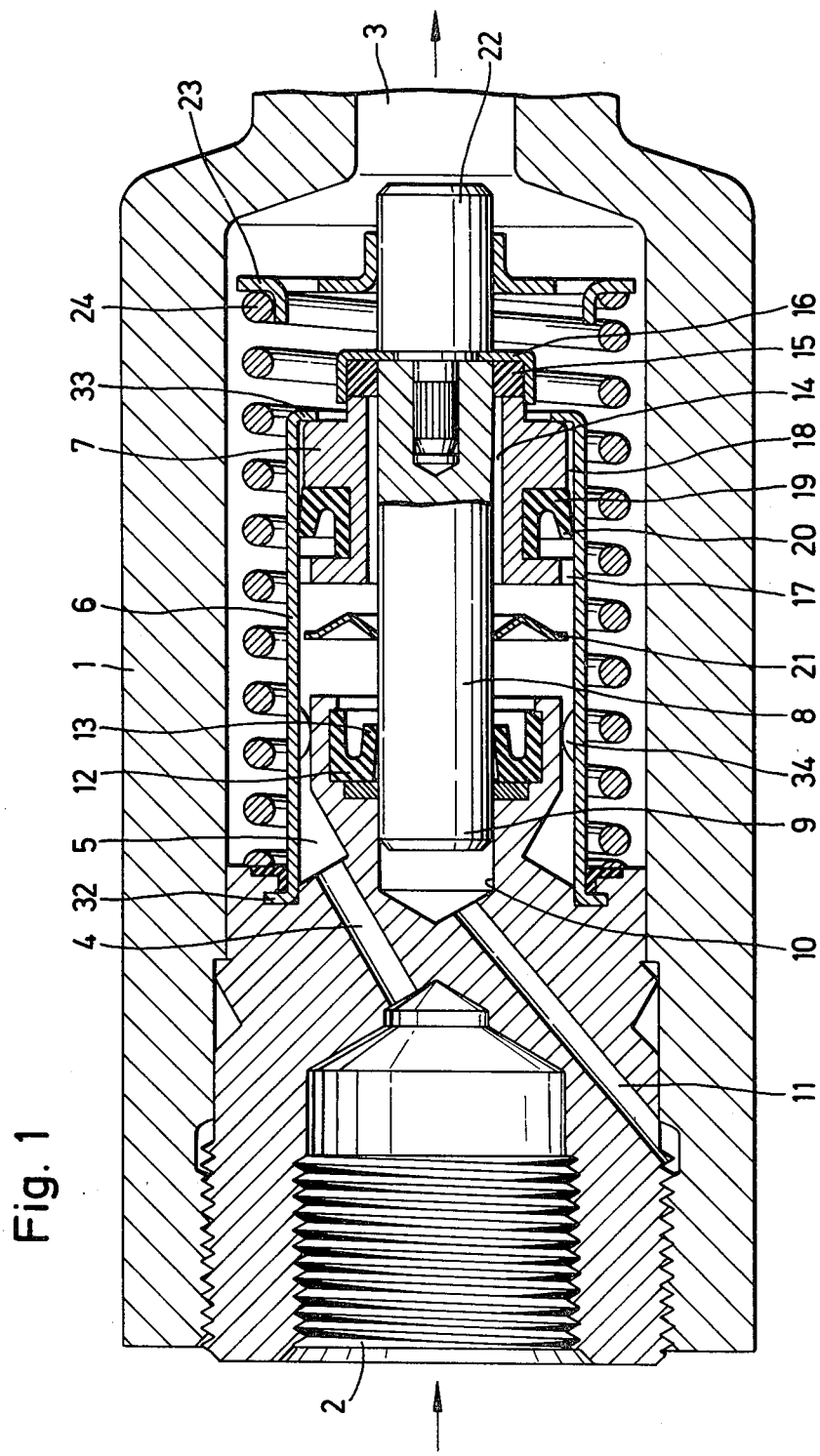
FIG. 1 is a longitudinal cross sectional view of a braking pressure control valve in accordance with the principles of the present invention.
Figure 2:
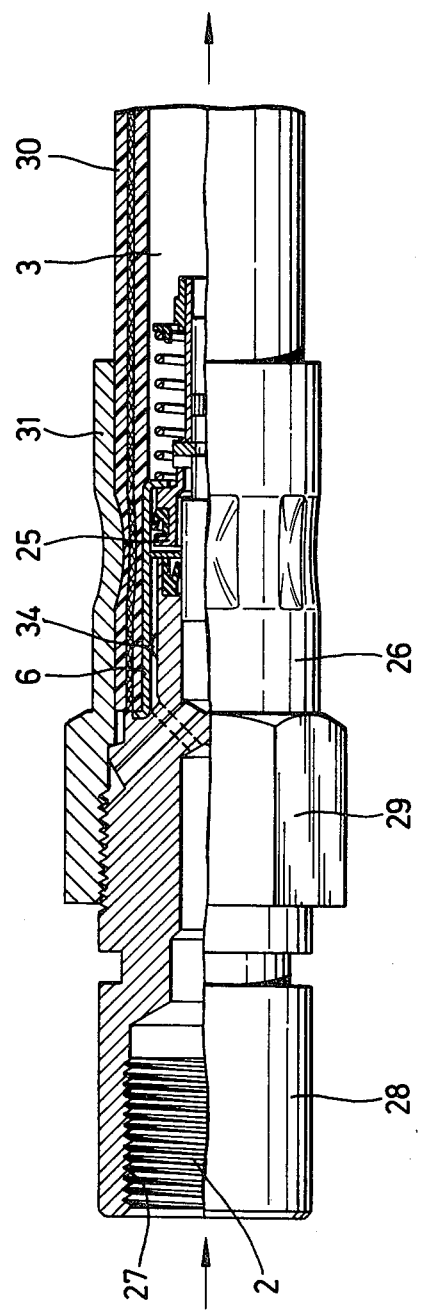
FIG. 2 is a partial longitudinal cross sectional view of a braking pressure control valve incorporating an advantageous construction of the housing in accordance with the principles of the present invention.

Those parts of FIGS. 1 and 2 that correspond to each other have been assigned the same reference numerals.

In FIG. 1, reference numeral 1 designates a substantially cylindrical housing provided with an inlet 2 and an outlet 3. From inlet 2, a channel 4 leads to a pressure chamber 5, which on its part is basically defined by a tubular member 6, an annular member 7 disposed at the open end of tubular member 6, a cylindrical control piston 8 and parts of housing 1. The piston portion 9 on the left-hand side, when viewing the drawing, is guided in a blind-end bore 10 of housing 1, bore 10 having a connection to atmosphere via a channel 11. A sealing ring 12 encompassing control piston 8 is inserted between the chamber, which is formed by blind-end bore 10 and the left-hand end surface of control piston 8, and the pressure chamber 5. Sealing ring 12 includes a circumferential sealing lip 13 which, in the presence of pressure in pressure chamber 5, bears against parts of housing 1 and prevents fluid to flow from pressure chamber 5 to channel 11.

Annular member 7 encompassing control piston 8 has at its inner annular surface passageways 14 which are closed by a ring seal 15 rigidly connected with control piston 8 in the illustrated control position of the braking pressure control valve. At the surfaces not serving to seal passageways 14, ring seal 15 is surrounded by a retaining ring 16 which prevents the flow of the plastic material of the ring seal 15 when subjected to high pressure loads. There are likewise provided passageways 17 and 18 at the outer annular surface of annular member 7. Another sealing ring 19 having a sealing lip 20 is inserted between these passageways 17 and 18 in such a manner that the passageways 17 and 18 are opened exclusively in the event of a pressure gradient from outlet 3 to pressure chamber 5. The portion of control piston 8 projecting from annular member 7 toward the left-hand side when viewing the drawing carries a stationary stop 21. Fastened at the right-hand piston portion 22 is a spring plate 23 which serves as a support for a compression spring 24 bearing in addition against parts of housing 1 so that stop 21 moves in abutment with annular member 7 in the non-illustrated rest position of the braking pressure control valve.

The mode of operation of the braking pressure control valve described is as follows.

In the non-illustrated rest position, compression spring 24 retains control piston 8 in a right-hand end position, in which stop 21 abuts at annular member 7 and passageways 14 are opened. A pressure increase in inlet 2 will therefore propagate through channel 4 to pressure chamber 5 and will get through opened passageways 14 to outlet 3. When a predetermined pressure level has been attained in outlet 3, the amount of force acting on the end surface of the right-hand piston portion 22 will be sufficient to displace control piston 8 to the left, when viewing the drawing, against the force of compression spring 24, until stop 21 is situated at a specific distance from annular member 7, while ring seal 15 moves in abutment with annular member 7 and closes passageways 14. This is the position shown in the drawing in which the control of the pressure in outlet 3 has commenced.

With the pressure in inlet 2 continuing to increase, ring seal 15 will gradually lift off of annular member 7 again and open passageways 14 which results in a further pressure increase in outlet 3 as well. However, a pressure increase in outlet 3 has as a consequence an increased reaction force on control piston 8 so that ring seal 15 will again abut annular member 7. Thus, the described mode of operation of the braking pressure control valve conditions that any pressure value in inlet 2 lying above the control pressure has as a result a pressure in outlet 3 which is reduced in a ratio of the pressurized surfaces. In the event of a pressure decrease in inlet 2, annular member 7 will be displaced through ring seal 15 to the left, when viewing the drawing, so that a volume increase and a corresponding pressure decrease takes place in outlet 3, with the pressure gradient depending again on the ratio of the pressurized surfaces and corresponding to the pressure gradient during the pressure rise. The displacement of annular member 7 is continued, until the pressure levels in inlet 2 and in outlet 3 are in approximate agreement with each other. At that moment, sealing lip 20 will lift and open the pressure fluid channels 17 and 18 so that a complete pressure balance is permitted to take place between inlet 2 and outlet 3. A movement of control piston 8 to the left, when viewing the drawing, will allow the air cushion disposed in blind-end bore 10 to escape into atmosphere via channel 11 so that no displacement of the change-over point will be caused by the force of a compressed air cushion. The rest position of annular member 7 is brought about by stop 21.

In the case of the pressure control valve described, the change-over point is finally predetermined by simple means during the assembly by displacing spring plate 23, after having moved control piston 8 into the right-hand end position, over the peripheral surface of control piston 8 until the correct spring force has been obtained. This final position of spring plate 23 will subsequently be fixed by means of a spot-welding connection, for example.

In the embodiment illustrated in FIG. 1, tubular member 6 includes at its openings collars 32 and 33, respectively, with collar 32, shown on the left-hand side of the drawing, being sealingly accommodated in housing 1 and collar 33, shown on the right-hand side of the drawing, serving to limit the movement of annular member 7. Improving upon the present invention, it is conceivable to arrange compression spring 24 between right-hand collar 33, when viewing the drawing, and spring plate 23. Such a measure renders possible the attainment of a smaller diameter causing an increased overall length, however. Compression spring 24 is likewise able to be replaced by a spring inserted in blind-end bore 10. However, this construction does not afford the possibility of subsequently adjusting the change-over point. In addition, fluid can be fed via channel 11 into blind-end bore 10 whose pressure is proportional to the bounce of the rear axle and exerts a corresponding force on control piston 8. Besides, a step at control piston 8 is able to assume the position of stop 21, as is indicated in FIG. 2.

Consequently, the pressure control valve described distinguishes first of all in that the change-over point can be adjusted by adjusting the compression spring, with just a force-measuring device serving as an auxiliary means. The valve unit may be fitted subsequently to any housing desired as a pre-fabricated and already adjusted component which will be conducive to storage. In particular in the event the compression spring diameter is chosen of large dimension in contrast to the diameters of the sealing elements, there will result low friction forces and compression springs which provide ease of manufacture.

In FIG. 2, a valve unit as described with reference to FIG. 1 designated by reference numeral 25 is inserted into a substantially cylindrical housing 26 which is constructed as a connecting socket 28 provided with an internal thread 27 at its left end. Moreover, housing 26 includes an external hexagonal nut 29 for accommodation of a wrench. Led to the right-hand part of housing 26 is a brake hose 30 which is clamped between a tubular housing extension 31 and the tubular member 6, with supports 34 being arranged between the inner peripheral surface of tubular member 6 and housing 1 to receive the radial forces. The non-illustrated end of the brake hose 30 is provided with a screw coupling mechanism in a hitherto known manner. By these means, there results a hose connection which can be handled like a conventional brake hose but which contains a pressure control valve. Alternatively, connecting socket 28 is able to be disposed at inlet 2 or at outlet 3 depending upon a screw coupling being desired to be established with the master cylinder or with the wheel brake cylinder.

Besides the easier handling mentioned already, the advantages of the embodiment shown in FIG. 2 can be seen in particular in that there is no need for a hose line coupled to a pressure control valve which is arranged separately. In contrast to known embodiments with the pressure control valves being integrated in the master cylinder, there results the advantage that the pressure control valve is not required to be replaced simultaneously with a defect at the master cylinder. The mounting position of the device described may be chosen freely since connecting socket 28 is allowed to be formed at the right-hand or at the left-hand side of the housing alternatively. Besides, the device can be provided regardless of the position of brake hose 30.

While we have described above the principles of our invention in connection with specific apparatus, it is to be clearly understood that this description is made only by way of example and not as a limitation to the scope of our invention as set forth in the objects thereof and in the accompanying claims.

We claim:

1. A pressure control valve for a vehicular hydraulic brake system comprising:
    a housing having a longitudinal axis, a pressure fluid inlet and a pressure fluid outlet;
    a valve disposed in said housing between said inlet and said outlet for pressure control, said valve including
        a tubular member disposed in said housing coaxial of said axis,
        an annular member disposed coaxial of said axis within said tubular member in an axially slidable relationship therewith,
        a control piston disposed coaxial of said axis extending through and in a slidable relationship with said annular member, and
        a sealing device carried by said control piston cooperating with said annular member to provide said pressure control; and
    a compression spring disposed in said housing coaxial of said axis outside said tubular member, said spring acting on said control piston to provide a force against which said spring must act to establish a predetermined change-over point for said pressure control valve, said spring abutting against at least one abutment surface which is adjustable during assembly.

2. A pressure control valve according to claim 1, wherein
    said spring encompasses said tubular member and has one end abutting said housing and the other end abutting an axially adjustable spring plate disposed adjacent one end of said control piston.

3. A pressure control valve according to claim 1, wherein
    said spring has a diameter substantially equal to the diameter of said tubular member and extends between said tubular member and an adjustable spring plate disposed adjacent one end of said control piston.

4. A pressure control valve according to claims 1, 2 or 3, wherein
    said control piston is guided with axial play in said annular member to provide a passageway controllable by said sealing device.

5. A pressure control valve according to claims 1, 2 or 3, wherein
    said control piston has an outer peripheral surface in contact with an inner peripheral surface of said annular member and at least one passageway is provided adjacent a contact surface of said outer peripheral surface and said inner peripheral surface, said passageway being controllable by said sealing device.

6. A pressure control valve according to claim 5, wherein
    said control piston has a portion thereof adjacent said inlet guided in a blind-end bore of said housing and atmospheric pressure is provided in said blind-end bore.

7. A pressure control valve according to claim 6, wherein
    said tubular member includes an inwardly extending collar at the end thereof adjacent said outlet to limit movement of said annular member.

8. A pressure control valve according to claim 7, wherein
    said abutment surface is provided by an axial adjustable spring plate disposed adjacent the end of said control piston adjacent said outlet, said spring plate being secured to said control piston after adjustment thereof.

9. A pressure control valve according to claims 1, 2 or 3, wherein
    said control piston has a portion thereof adjacent said inlet guided in a blind-end bore of said housing and atmospheric pressure is provided in said blind-end bore.

10. A pressure control valve according to claim 9, wherein
    said tubular member includes an inwardly extending collar at the end thereof adjacent said outlet to limit movement of said annular member.

11. A pressure control valve according to claim 10, wherein
    said abutment surface is provided by an axial adjustable spring plate disposed adjacent the end of said control piston adjacent said outlet, said spring plate being secured to said control piston after adjustment thereof.

12. A pressure control valve according to claims 1, 2 or 3, wherein
    said tubular member includes an inwardly extending collar at the end thereof adjacent said outlet to limit movement of said annular member.

13. A pressure control valve according to claim 12, wherein
    said abutment surface is provided by an axial adjustable spring plate disposed adjacent the end of said control piston adjacent said outlet, said spring plate being secured to said control piston after adjustment thereof.

14. A pressure control valve according to claims 1, 2 or 3, wherein
said abutment surface is provided by an axial adjustable spring plate disposed adjacent the end of said control piston adjacent said outlet, said spring plate being secured to said control piston after adjustment thereof.

15. A pressure control valve according to claim 1, wherein
a brake hose is clamped between said tubular member and a tubular extension of said housing.

16. A pressure control valve according to claims 1 or 15, further including
supports disposed at the inner peripheral surface of said tubular member abutting a portion of said housing extending therein.

17. A pressure control valve according to claim 1, wherein
said housing, said valve and said spring are integrated components of a brake hose.

* * * * *